United States Patent
Lagnado et al.

(10) Patent No.: US 11,630,557 B2
(45) Date of Patent: Apr. 18, 2023

(54) ALERTS FOR VIRTUAL MEETINGS

(71) Applicant: Hewlett-Packard Development Company, L.P., Spring, TX (US)

(72) Inventors: Isaac Lagnado, Spring, TX (US); I-Chen Lin, Taipei (TW); Chung-Chun Chen, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/344,083

(22) Filed: Jun. 10, 2021

(65) Prior Publication Data

US 2022/0398904 A1    Dec. 15, 2022

(51) Int. Cl.
*G06F 3/0484*    (2022.01)

(52) U.S. Cl.
CPC .................. *G06F 3/0484* (2013.01)

(58) Field of Classification Search
None
See application file for complete search history.

(56) References Cited

U.S. PATENT DOCUMENTS

| | | | | |
|---|---|---|---|---|
| 6,385,662 B1* | 5/2002 | Moon | ...................... | G06F 9/542 719/318 |
| 6,629,129 B1* | 9/2003 | Bookspan | .............. | G06Q 10/10 709/204 |
| 8,589,487 B1* | 11/2013 | Reeves | ................. | H04L 65/403 709/204 |
| 8,838,146 B2 | 9/2014 | Yoon | | |
| 8,984,422 B2 | 3/2015 | Eidelson | | |
| 9,473,618 B2 | 10/2016 | Woloshyn | | |
| 9,874,990 B2* | 1/2018 | Khalatian | ............. | G06F 3/0481 |
| 10,044,980 B1* | 8/2018 | Graham | ................ | G06V 20/40 |
| 2002/0051017 A1 | 5/2002 | Wishoff | | |
| 2003/0210265 A1* | 11/2003 | Haimberg | ............. | H04L 51/043 715/758 |
| 2004/0001101 A1* | 1/2004 | Trajkovic | ................ | G06F 21/84 715/781 |
| 2004/0098462 A1* | 5/2004 | Horvitz | ................... | H04L 51/24 709/207 |
| 2004/0194110 A1* | 9/2004 | McKee | .................. | G06Q 10/10 719/310 |
| 2005/0018828 A1* | 1/2005 | Nierhaus | ................. | H04L 29/00 709/204 |
| 2005/0202806 A1* | 9/2005 | Bourgeois | ............. | H04W 84/08 455/414.1 |

(Continued)

FOREIGN PATENT DOCUMENTS

CA    2999650 C  *  4/2020  ............. G10L 15/22
WO    WO-2009054783 A1 *  4/2009  ........... A61B 5/0022

*Primary Examiner* — Mandrita Brahmachari
(74) *Attorney, Agent, or Firm* — Knobbe, Martens, Olson & Bear, LLP

(57) ABSTRACT

Example implementations relate to alerts for virtual meetings. In some examples, a computing device can include a processor, where the processor is to in response to a virtual meeting having been initiated, determine whether a graphical user interface of the virtual meeting is minimized in a desktop environment and whether communication has occurred in the virtual meeting, and in response to communication having occurred and the graphical user interface being minimized, cause an alert to be displayed on a display panel.

14 Claims, 6 Drawing Sheets

(56) References Cited

U.S. PATENT DOCUMENTS

| | | | |
|---|---|---|---|
| 2005/0223069 A1* | 10/2005 | Cooperman | H04L 51/04 |
| | | | 709/206 |
| 2006/0224593 A1* | 10/2006 | Benton | G06F 16/951 |
| 2007/0016873 A1* | 1/2007 | Lindsay | G06F 3/0481 |
| | | | 715/781 |
| 2007/0094360 A1* | 4/2007 | Forlenza | G06Q 10/107 |
| | | | 709/220 |
| 2007/0220112 A1* | 9/2007 | Knight | H04L 67/325 |
| | | | 709/219 |
| 2008/0040187 A1* | 2/2008 | Carraher | G06Q 10/1095 |
| | | | 705/7.19 |
| 2008/0140709 A1* | 6/2008 | Sundstrom | G06F 16/958 |
| | | | 719/330 |
| 2009/0061829 A1* | 3/2009 | Harris | H04M 1/72454 |
| | | | 455/566 |
| 2010/0251119 A1 | 9/2010 | Geppert | |
| 2010/0306669 A1* | 12/2010 | Della Pasqua | G06Q 10/107 |
| | | | 715/752 |
| 2013/0006848 A1* | 1/2013 | Kuttuva | G06Q 20/3223 |
| | | | 705/39 |
| 2013/0212466 A1* | 8/2013 | Khalatian | G06Q 50/01 |
| | | | 715/753 |
| 2013/0311035 A1* | 11/2013 | Czyz | B60R 25/1004 |
| | | | 342/52 |
| 2015/0004945 A1* | 1/2015 | Steeves | H04L 51/224 |
| | | | 455/412.2 |
| 2016/0065625 A1* | 3/2016 | Ouyang | H04L 65/80 |
| | | | 715/753 |
| 2016/0165038 A1 | 6/2016 | Lim | |
| 2016/0202866 A1* | 7/2016 | Zambetti | G06F 3/0488 |
| | | | 715/835 |
| 2018/0077542 A1* | 3/2018 | Xie | H04W 4/12 |
| 2021/0225177 A1* | 7/2021 | Kostiuk | G01C 23/00 |

\* cited by examiner

ALERTS FOR VIRTUAL MEETINGS

BACKGROUND

Some users of computing devices may utilize their computing devices in different environments. Certain computing devices can be portable to allow a user to carry or otherwise bring with the computing device in different settings. A computing device can allow a user to utilize computing device operations for work, education, gaming, multimedia, and/or other general use in such different settings.

DETAILED DESCRIPTION

Figure 1:
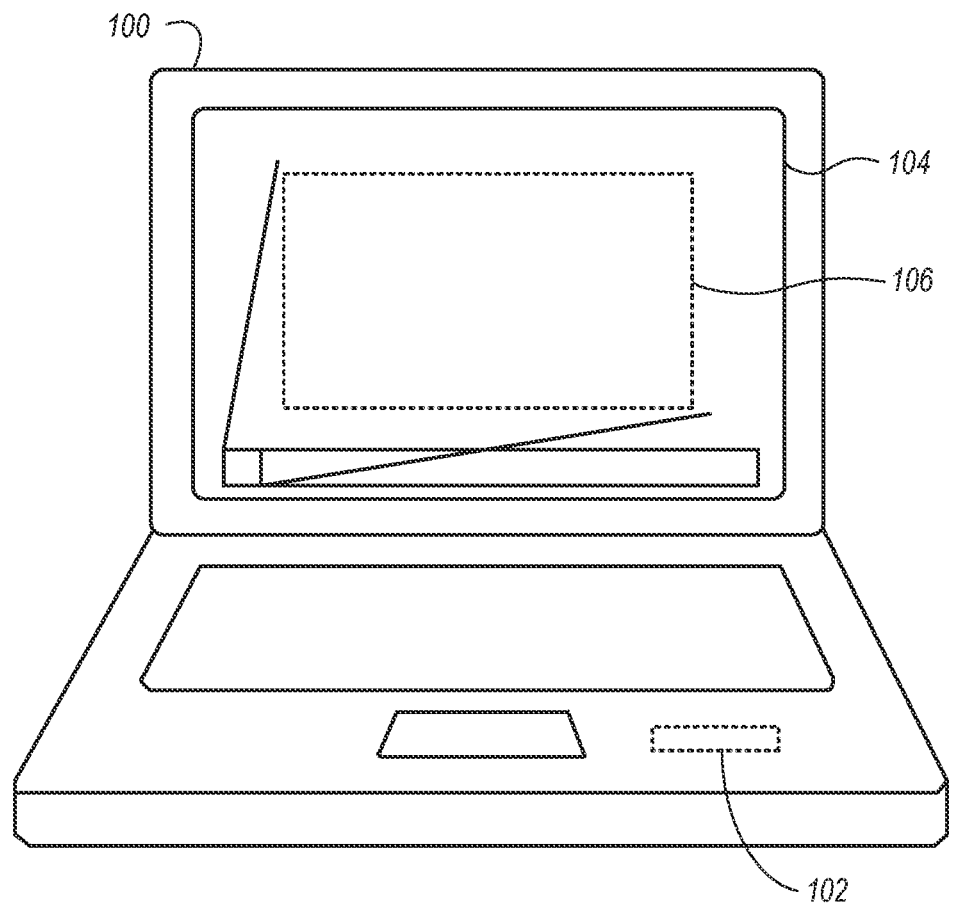
FIG. 1 illustrates an example of a computing device including a display panel for alerts for virtual meetings having a graphical user interface that is minimized consistent with the disclosure.

A user may utilize a computing device for various purposes, such as for business and/or recreational use. As used herein, the term "computing device" refers to an electronic system having a processing resource, memory resource, and/or an application-specific integrated circuit (ASIC) that can process information. A computing device can be, for example, a laptop computer, a notebook, a desktop, a tablet, and/or a mobile device, among other types of computing devices.

During a virtual meeting (e.g., conducted via a user's computing device), an input device can capture the user's actions. For example, a camera associated with the computing device may capture a user's motions, the user may speak, and such audio produced by the user can be received by a microphone associated with the computing device, or combinations thereof. As used herein, the term "virtual meeting" refers to a conference extended by computing device software in which the reception and transmission of audio signals, video signals, or combinations thereof occurs between participants in different locations. For example, multiple participants connected to a virtual meeting may conduct a meeting in which a first participant can communicate, through the first participant's computing device, with a second participant through the second participant's computing device and vice versa via transmission of audio signals, video signals, or combinations thereof therebetween.

When such a virtual meeting is initiated, a user may connect to the virtual meeting as a participant. A graphical user interface of the virtual meeting may be displayed on a display panel of a display device in a desktop environment. As used herein, the term "desktop environment" refers to a collection of instructions running on top of an operating system that comprises a desktop graphical user interface. As used herein, the term "graphical user interface" refers to a graphical control element having a visual area including an arrangement of information grouped together for presentation on a display panel of a display device. As used herein, the term "display device" refers to an output device that includes a display panel that displays information provided by an electrical signal in a visual and/or tactile form. As used herein, the term "display panel" refers to an area of a display device that displays information. For example, a computing device can include a display device having a display panel that can display information such as text, videos, images, or combinations thereof as a result of an electrical signal provided to the display from the computing device. Such information can include a graphical user interface of the virtual meeting displayed on the display panel.

In some examples, the user may be unaware the virtual meeting is being conducted. For example, while waiting for the virtual meeting to start, the user may minimize the graphical user interface in the desktop environment and forget the virtual meeting is being conducted. As another example, the user may utilize multiple display devices associated with the computing device and may have the graphical user interface of the virtual meeting located on a first display panel of a first display device but be focused on a second display panel of a second display device.

Further, a user may, in some instances, have an audio output device of the computing device muted when the virtual meeting is being conducted. As a result, the user may not hear audible output associated with the virtual meeting from the computing device to cue the user that the virtual meeting is being conducted. Further, the user (e.g., as a participant of the virtual meeting) may have an input device of the computing device enabled. Such input devices may include a microphone, camera, or combinations thereof. Accordingly, the user may produce audible speech or perform actions that are not intended for transmission to other users participating in the virtual meeting, as the user is unaware the virtual meeting is being conducted.

Alerts for virtual meetings can allow for notification mechanisms to alert a user to the initiation of a virtual meeting. When the virtual meeting is underway, a computing device can determine whether to cause an alert to be displayed for a user to cue the user that the virtual meeting is being conducted. Such alerts can inform the user that the virtual meeting is underway, allowing for greater user participation and more efficient virtual meetings, as compared with previous approaches. Further, such alerts can prevent a user from transmitting unintended audio, video, or combinations thereof to other users participating in the virtual meeting.

FIG. 1 illustrates an example of a computing device 100 including a display panel 104 for alerts for virtual meetings having a graphical user interface 106 that is minimized consistent with the disclosure. As illustrated in FIG. 1, the computing device 100 can include a processor 102, the display panel 104, and a graphical user interface 106.

As mentioned above, a user may utilize the computing device 100 to conduct a virtual meeting as a participant to the virtual meeting. For example, the user may connect to the virtual meeting using the computing device 100, where the virtual meeting can be displayed in a graphical user interface 106 displayed on the display panel 104 of the computing device 100.

The processor 102 of the computing device 100 can determine the virtual meeting has been initiated in response to a connection being initiated between the computing device 100 and a remote computing device (e.g., not illustrated in FIG. 1). For example, the computing device 100 can connect to another remote computing device in order to allow for a user of the computing device 100 to conduct a virtual meeting with another participant (e.g., associated with the remote computing device, another computing device connected to the remote computing device, etc.) The processor 102 can then determine whether the connection between the computing device 100 and the remote computing device is initiated.

When such a connection is initiated and the virtual meeting has been initiated, in some examples, a user may minimize the graphical user interface 106 (e.g., as illustrated in FIG. 1) of the virtual meeting in the desktop environment displayed on the display panel 104. For example, the user may have initiated a connection to the virtual meeting prior to a scheduled start time of the virtual meeting. The user may minimize the graphical user interface 106 in order to perform other tasks while waiting for the virtual meeting to start. In some instances, the user may forget about the virtual meeting. For example, the user may be focused on other tasks, other graphical user interfaces on the display panel 104, etc., and forget they have initiated a connection with the virtual meeting. In such an example, the user may not be participating in the virtual meeting as it is being conducted. Accordingly, the computing device 100 can determine whether to change a state of the graphical user interface 106 in order to focus the user's attention on the virtual meeting, as is further described herein.

In response to the virtual meeting having been initiated, the processor 102 can determine a state of the graphical user interface 106 of the virtual meeting. For example, the processor 102 can determine whether the graphical user interface 106 is minimized in the desktop environment. As used herein, the term "minimized" refers to a state of a graphical control element in which the graphical control element is hidden in the desktop environment, but a computing program associated with the graphical control element runs in the background. For example, the graphical user interface 106 of the virtual meeting may be minimized so that it is not viewable on the display panel 104, but a computing program associated with the virtual meeting is still being run in the background by an operating system of the computing device 100. Therefore, although the graphical user interface 106 of the virtual meeting may be minimized, the virtual meeting may still be being conducted by other participants that may be in attendance, as is further described herein. Further, an input device (e.g., a camera and/or microphone) of the computing device 100 may be enabled and transmitting audible speech or actions by a user that are not intended for transmission to other participants in the virtual meeting.

Additionally, in response to the virtual meeting having been initiated, the processor 102 can determine whether communication has occurred in the virtual meeting. The processor 102 can determine whether communication has occurred in the virtual meeting by determining whether audio communication, video communication, textual communication, or combinations thereof have occurred, as is further described in connection with FIG. 2.

In response to the communication having occurred and the graphical user interface 106 being minimized, the processor 102 can change a state of the graphical user interface 106. For example, the processor 102 can cause an alert to be displayed on the display panel 104, cause an icon to flash on the display panel 104, display an operating system alert, cause an alert to be displayed in response to receiving an input from a host and/or other attendees of the virtual meeting, cause modification of an audio output device of the computing device 100, or combinations thereof, as is further described herein with respect to FIGS. 2-3C.

Figure 2:
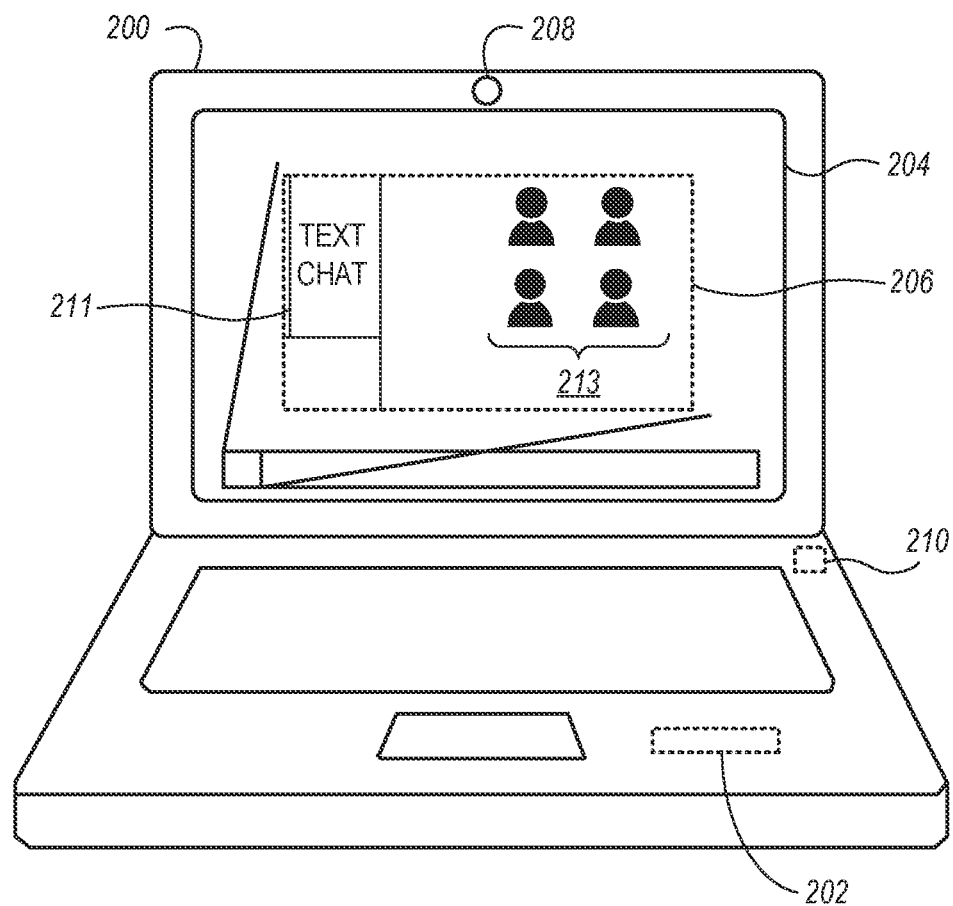
FIG. 2 illustrates an example of a computing device including a display panel having a graphical user interface for alerts for virtual meetings consistent with the disclosure.

FIG. 2 illustrates an example of a computing device 200 including a display panel 204 having a graphical user interface 206 for alerts for virtual meetings consistent with the disclosure. As illustrated in FIG. 2, the computing device 200 can include a processor 202, the display panel 204, a graphical user interface 206, an input device 208, and an audio output device 210.

The computing device 200 can include an audio output device 210. As used herein, the term "audio output device" refers to a device that converts an electrical audio signal into a corresponding audible sound. For example, the audio output device 210 can output audible sounds. The audio output device 210 can be, for example, a speaker included as part of the computing device 200. Audible sounds output from the audio output device 210 may include, for instance, music, audible speech (e.g., from other participants connected to the virtual meeting), or combinations thereof, etc.

As mentioned above, the computing device 200 can include an input device 208. As used herein, the term "input device" refers to a device that captures information and converts the information into an electrical signal. For example, the input device 208 can capture audio, images, video, or combinations thereof, and convert such information into an electrical signal.

In some examples, the input device 208 may be enabled while the virtual meeting has been initiated. In an example in which the user of the computing device 200 is unaware the input device 208 is enabled, the input device 208 may capture unintended audio, video, or combinations thereof from the user, which can be transmitted to other participants in the virtual meeting. Accordingly, the processor 202 can determine whether the input device is enabled, as is further described herein.

In some examples, the input device 208 can be a camera. As used herein, the term "camera" refers to a device that converts captured images into an electrical signal. The input device 208 can be a video camera that can capture a single image, a series of images, video, etc. The input device 208 may, for example, capture a participant's movements and convert those images/video into an electrical signal for transmission to other participants in the virtual meeting.

In some examples, the input device 208 can be a microphone. As used herein, the term "microphone" refers to a device that converts sound into an electrical signal. While conducting a virtual meeting, the user of the computing device 200 may audibly speak and the input device 208 can convert such audible speech into an electrical signal for transmission to other participants in the virtual meeting.

As illustrated in FIG. 2, a virtual meeting may have been initiated. The virtual meeting can be displayed via the graphical user interface 206 on the display panel 204. The graphical user interface 206 displayed on the display panel 204 can include, for example, a text chat display 211, participants 213 to the virtual meeting, among other information. The participants 213 can include those participants who have connected to the virtual meeting. The text chat display 211 can display textual inputs that may be typed into a computing device of a respective participant in the virtual meeting for other participants to see.

Although the virtual meeting as illustrated in FIG. 2 is shown on the display panel 204, the graphical user interface 206 may not be visible to a user of the computing device 200 since the graphical user interface 206 can be minimized. As indicated by the dashed lines surrounding the graphical user interface 206, the graphical user interface 206 may be minimized in the desktop environment displayed on the display panel 204, as is further described herein.

In response to a virtual meeting having been initiated, the processor 202 can determine whether the graphical user interface 206 of the virtual meeting is minimized in the desktop environment. For example, the user of the computing device 200 may have initiated a connection to the virtual meeting prior to a scheduled start time of the virtual meeting and then minimized the graphical user interface 206 via an input to the computing device 200 (e.g., in order to perform other tasks while waiting for the virtual meeting to start).

Additionally, in response to the virtual meeting having been initiated, the processor 202 can determine whether the audio output device 210 is muted. For example, if the user has muted the audio output device 210, the user may not hear any audible output from the audio output device 210. In such an instance, the user may not hear any audible speech output by other participants of the virtual meeting or other noises that would indicate to the user the virtual meeting has been initiated.

Further, in response to the virtual meeting having been initiated, the processor 202 can determine whether the input device 208 is enabled. For example, the processor 202 can determine whether the camera is enabled, whether the microphone is enabled, or combinations thereof (e.g., in an instance where the input device 208 is both a camera and a microphone.

Moreover, in response to the virtual meeting having been initiated, the processor 202 can determine whether communication has occurred in the virtual meeting. The processor 202 can determine whether communication has occurred in the virtual meeting by determining whether audio communication, video communication, textual communication, or combinations thereof have occurred, as is further described herein.

The processor 202 can determine whether audio communication has occurred in the virtual meeting. As used herein, the term "audio communication" refers to transmission of a signal that, when processed, emits an audible sound. For example, a participant 213 in the virtual meeting may transmit audible speech from the participant's computing device to the other participants' computing devices. The processor 202 may determine such audio communication has occurred in the virtual meeting by detecting transmission of the audible speech (e.g., the audio communication) from the participant to the other participants 213.

In some examples, the processor 202 can determine whether certain keywords are broadcast in the audio communication. For example, a participant may audibly speak a name of the user of the computing device 200, a username associated with the user utilized during the virtual meeting, etc., and the processor 202 can determine that the user's name/username has been broadcast.

The processor 202 can determine whether video communication has occurred in the virtual meeting. As used herein, the term "video communication" refers to transmission of a signal that, when processed, displays a series of images, video, or combinations thereof. For example, a participant in the virtual meeting may perform some movement that is captured and transmitted from the participant's computing device to the other participants' computing devices. The processor 202 may determine such video communication has occurred in the virtual meeting by detecting transmission of the captured images/video (e.g., the video communication) from the participant to the other participants 213.

The processor 202 can determine whether textual communication has occurred in the virtual meeting. As used herein, the term "textual communication" refers to transmission of a signal that, when processed, displays characters. For example, a participant in the virtual meeting may input characters into the text chat display 211 which can be transmitted from the participant's computing device to the other participants' computing devices. The processor 202 may determine such textual communication has occurred in the virtual meeting by detecting transmission of the textual input (e.g., the textual communication) from the participant to the other participants 213.

In some examples, the processor 202 can determine whether certain keywords are included in the textual communication. For example, a participant may type in a name of the user of the computing device 200 in the text chat display 211, and the processor 202 can determine that the user's name has been entered into the text chat display 211.

Such communication can be determined to have occurred via a driver. As used herein, the term "driver" refers to a software component of an operating system that retrieves data from a device and returns the data to the operating system. For example, the driver may retrieve certain data representing a textual input (e.g., a keyword, textual communication generally, etc.), video communication, audio communication, etc. and provide it to the processor 202. That is, the driver can detect transmission of textual communication, audio communication, video communication, or combinations thereof between participants of the virtual meeting. In some examples, the driver can detect whether the particular keyword is transmitted, whether a user's name/username is broadcast, etc. In some examples, the driver can detect audible speech by filtering a signal, where the signal may include audible speech and other sounds (e.g., music, background noise, etc.), and the driver can filter the audible speech from the other sounds and provide the audible speech to the processor 202.

While the processor 202 determines whether the communication between participants 213 has occurred, the graphical user interface 206 is minimized, the audio output device 210 is muted, the input device 208 is enabled, or combinations thereof, the user of the computing device 200 may be unaware the virtual meeting is being conducted. Accordingly, in response to the communication having occurred, the graphical user interface 206 being minimized, the audio output device 210 being muted, the input device 208 being enabled, or combinations thereof, the processor 202 can cause the audio output device 210 to be unmuted. Unmuting the audio output device 210 may cue the user of the computing device 200 that the virtual meeting is being conducted, as the user may begin to hear audio communication between participants 213. In some examples, the audio output device 210 can be unmuted for a predefined amount of time and can be again muted after the predefined amount of time has been exceeded. For example, the audio output device 210 can be unmuted for thirty seconds, and then muted again after the thirty seconds has elapsed. Such an approach can prevent broadcast of information (e.g., that may be sensitive) via the audio output device 210 to unauthorized users if, for example, the computing device 200 is temporarily unattended by the user of the computing device (e.g., the user may be using the restroom, getting food or a drink etc.)

Additionally or alternatively, in response to the communication having occurred, the graphical user interface 206 being minimized, the audio output device 210 being muted, the input device 208 being enabled, or combinations thereof, the processor 202 can change a state of the graphical user interface 206. The change in state of the graphical user interface 206 is further described in connection with FIGS. 3A, 3B, and 3C.

Figure 3A:
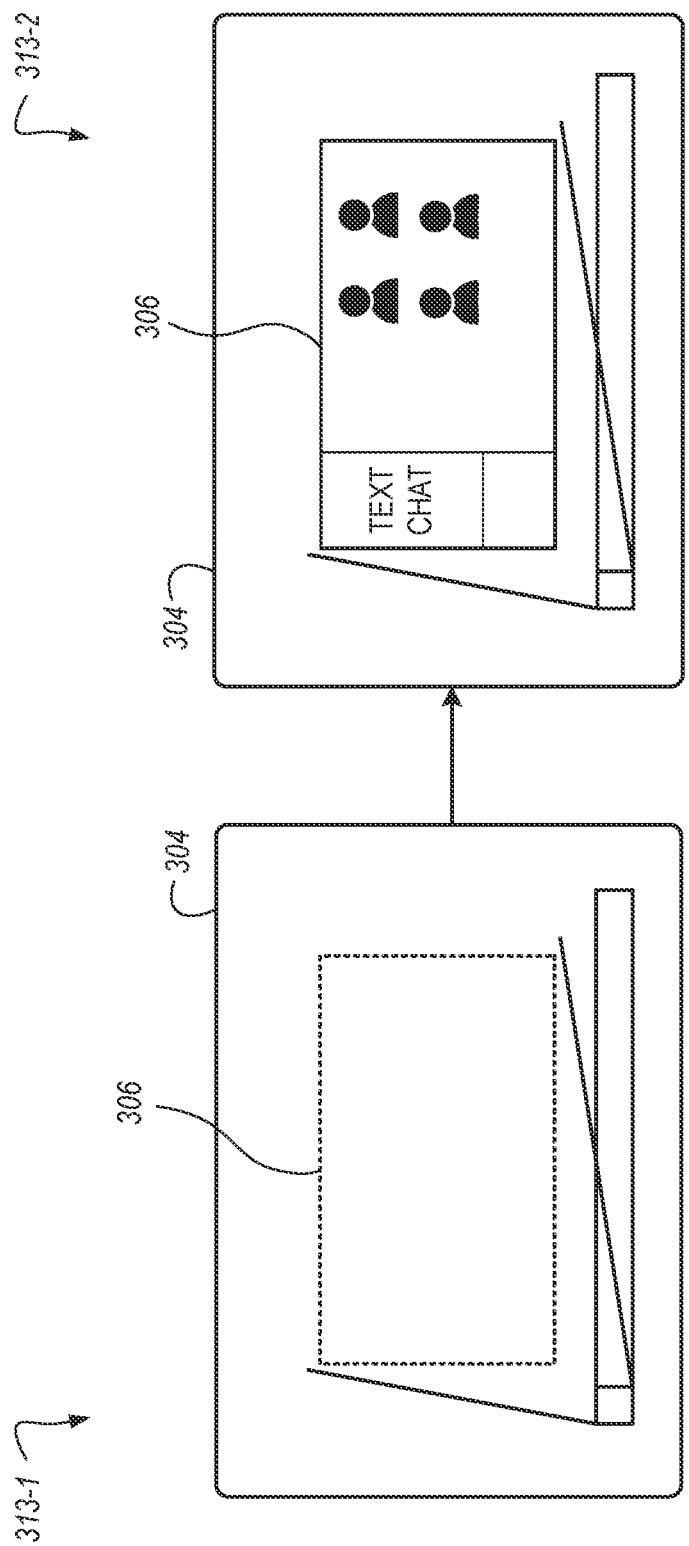
FIG. 3A illustrates an example of restoring a graphical user interface to display a virtual meeting on a display panel consistent with the disclosure.

FIG. 3A illustrates an example of restoring a graphical user interface 306 to display a virtual meeting on a display panel 304 consistent with the disclosure. A processor may change a state of the graphical user interface 306, as is further described herein.

As previously described in connection with FIGS. 1 and 2, a state of the graphical user interface 306 may be changed in order to focus the attention of a user of the computing device on a virtual meeting the user is a participant of. As illustrated in the display panel 304 at 313-1, the graphical user interface 306 is minimized. Accordingly, the user may not be able to see the contents of the virtual meeting.

The processor may change the state of the graphical user interface 306 by causing the graphical user interface 306 to be restored, as is illustrated at 313-2. As used herein, the term "restore" refers to enlarging a graphical control element associated with a program for display on a display panel. Restoring the graphical user interface 306 can include causing the graphical user interface 306 to be displayed on the display panel 304. Restoring the graphical user interface 306 at 313-2 can allow a user to see the graphical user interface 306 to cue the user that the virtual meeting is being conducted.

While the graphical user interface 306 is illustrated in FIG. 3A as being sized to take up less than the full amount of the display panel 304, examples of the disclosure are not so limited. For example, the graphical user interface 306 can be restored by being "maximized" in order to encompass the entirety of the graphical user interface 306.

In some examples, the processor can cause the graphical user interface 306 to be restored for a predefined amount of time. For example, the processor can cause the graphical user interface 306 to be restored for thirty seconds. The processor can then again minimize the graphical user interface 306 after the predefined amount of time has been exceeded. For example, the processor can cause the graphical user interface 306 to be minimized after thirty seconds has elapsed. Minimizing the graphical user interface 306 again after restoring the graphical user interface 306 for a predefined amount of time can prevent unauthorized persons from viewing content in the virtual meeting. Such minimizing after restoring may be useful if, for example, the computing device is temporarily unattended by the user of the computing device (e.g., the user may be using the restroom, getting food or a drink, etc.)

Figure 3B:
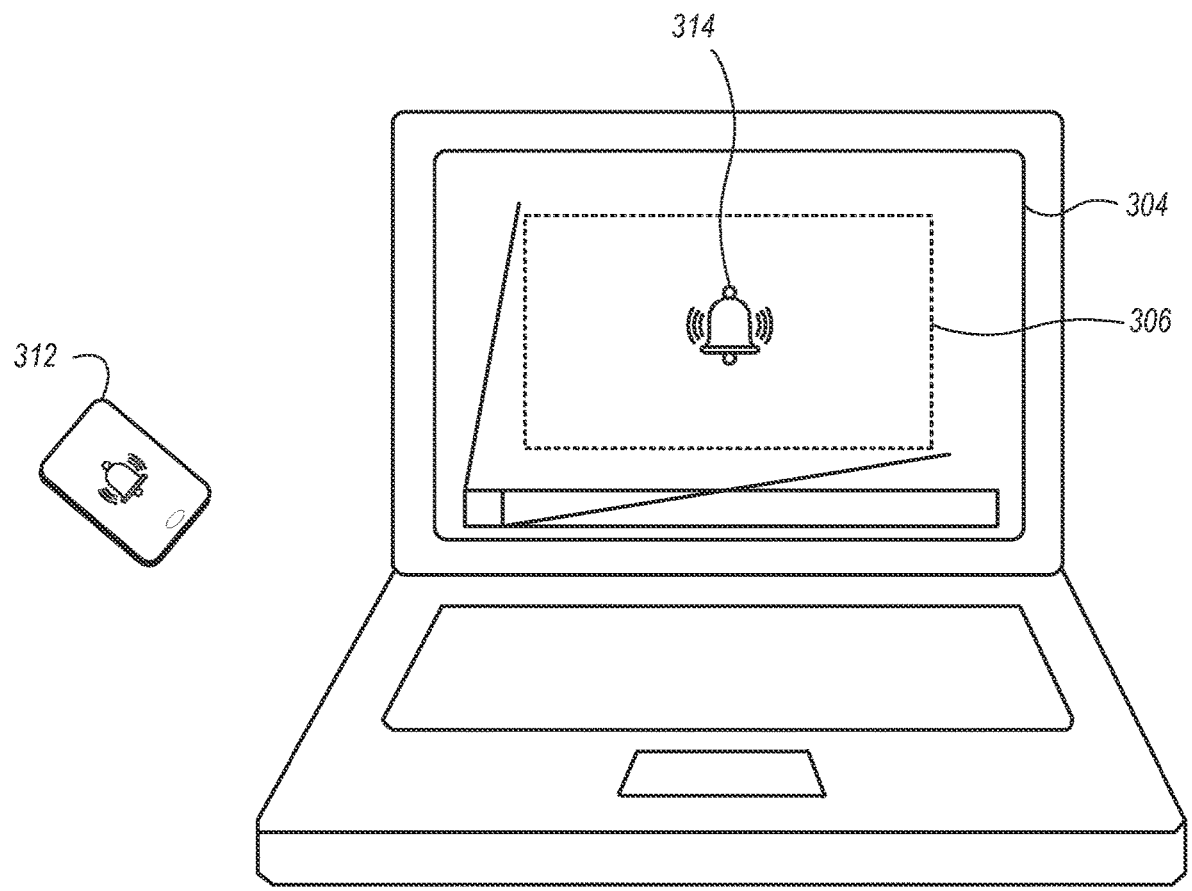
FIG. 3B illustrates an example of an alert displayed on a display panel and a mobile device consistent with the disclosure.

FIG. 3B illustrates an example of an alert 314 displayed on a display panel 304 and a mobile device 312 consistent with the disclosure. A processor may change a state of the graphical user interface 306, as is further described herein.

The processor may change the state of the graphical user interface 306 by causing an alert 314 to be displayed on the display panel 304. As used herein, the term "alert" refers to a notification that a set of criteria is satisfied. The alert 314 can be, for example, displayed on the display panel 304 in order to notify a user of the computing device 300 that the virtual meeting is being conducted. Displaying the alert 314 can allow a user to be notified that the virtual meeting is being conducted on the graphical user interface 306.

Although the graphical user interface 306 is illustrated in FIG. 3B as being minimized when the alert 314 is displayed on the graphical user interface 306, examples of the disclosure are not so limited. For example, the graphical user interface 306 may be being displayed (e.g., restored, maximized, etc.) and the alert 314 can be displayed on the graphical user interface 306.

As illustrated in FIG. 3B, the alert 314 can include an icon. The icon can be, for instance, a ringing bell. In some examples, the processor can cause the icon displayed on the display panel 304 to flash on the display panel 304. For example, the icon can repeatedly flash a color, flash multiple colors, include different animations, etc.

In some examples, the computing device 300 can transmit the alert 314 to a mobile device 312 associated with a user of the computing device 300. For example, the mobile device 312 may be connected to the computing device 300 via a network relationship, and the alert 314 can be transmitted by the computing device 300 to the mobile device 312 of the user to alert the user the virtual meeting is being conducted.

In some examples, the processor can cause the alert 314 to be displayed in response to receiving an input from a computing device (e.g., different from the computing device 300) associated with a host of the virtual meeting. For example, the host of the virtual meeting may be another participant and the host may determine a user of the computing device 300 is unaware the virtual meeting is being conducted. The host may transmit a signal that can be received by the computing device 300 as an input, and the computing device 300 can cause the alert 314 to be displayed on the display panel 304 to notify the user of the computing device 300 the virtual meeting is being conducted.

Figure 3C:
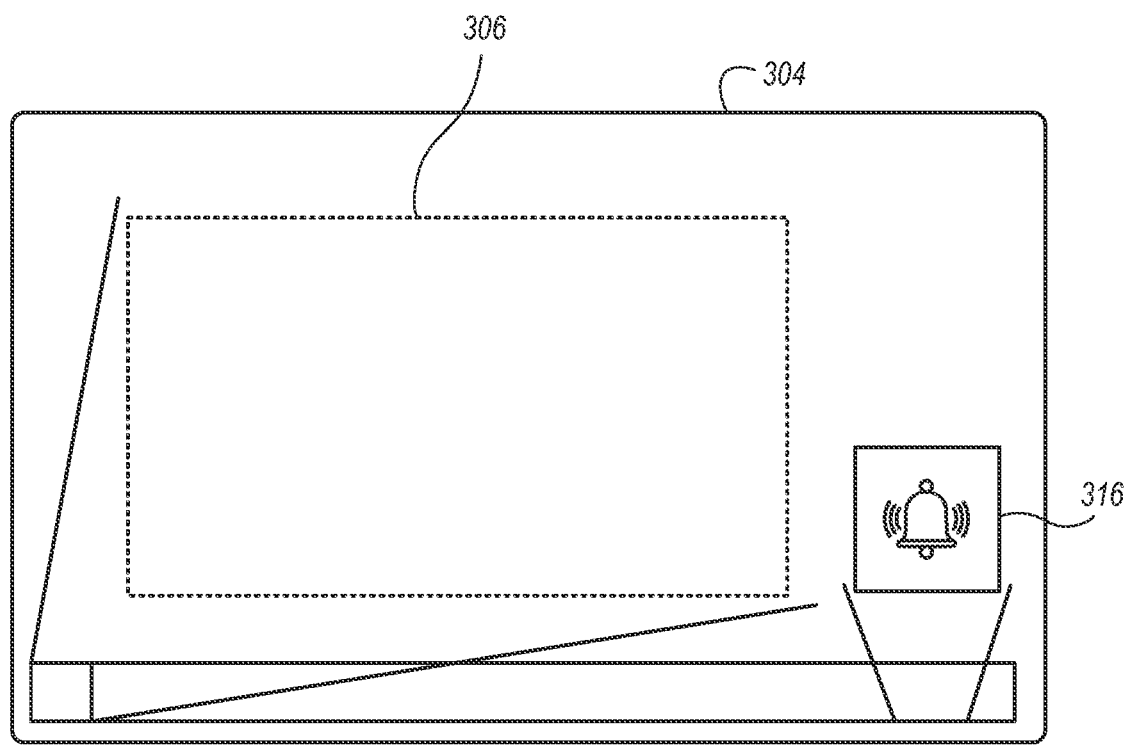
FIG. 3C illustrates an example of an operating system alert displayed on a display panel consistent with the disclosure.

FIG. 3C illustrates an example of an operating system alert 316 displayed on a display panel 304 consistent with the disclosure. A processor may change a state of the graphical user interface 306, as is further described herein.

The processor may change the state of the graphical user interface 306 by causing an operating system alert 316 to be generated and displayed on the display panel 304 via an operating system of the computing device. As used herein, the term "operating system" refers to executable instructions that manages computer hardware, software resources, and provides common services for computer programs. The operating system may generate and display the operating system alert 316 on the display panel 304. Displaying the operating system alert 316 can allow a user to be notified that the virtual meeting is being conducted on the graphical user interface 306. Further, the operating system alert 316 may override other settings which prevent alerts from computer programs from being displayed on the display panel 304.

Figure 4:
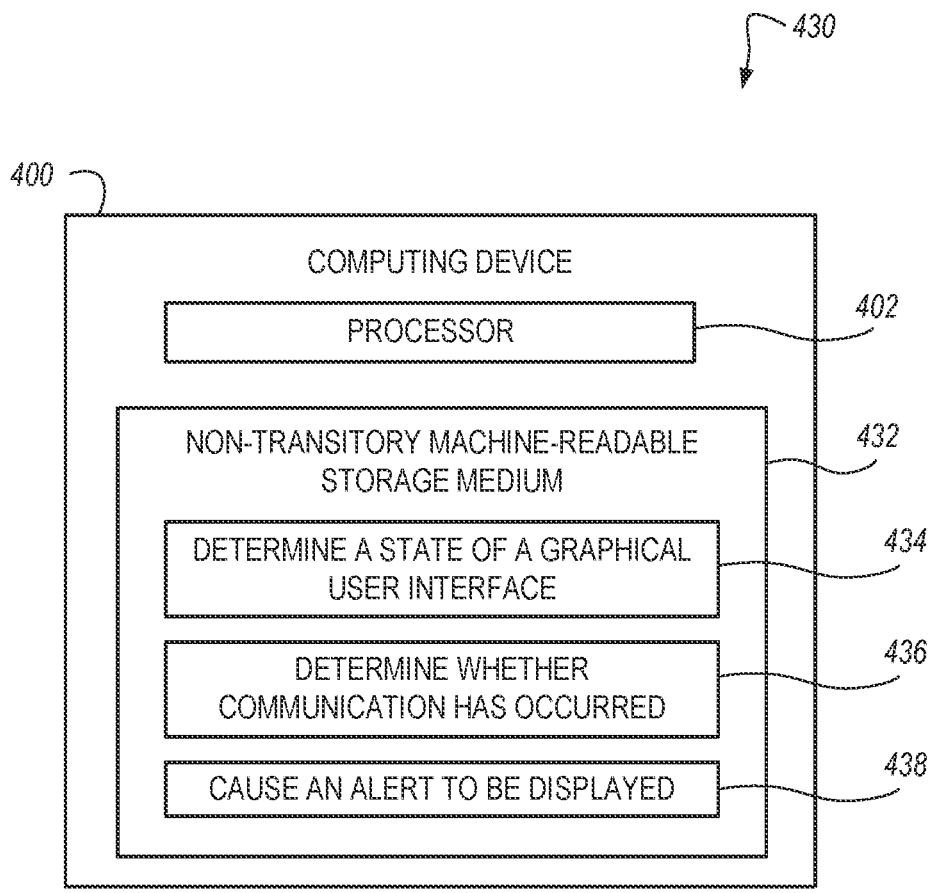
FIG. 4 illustrates a block diagram of an example system for alerts for virtual meetings consistent with the disclosure.

FIG. 4 illustrates a block diagram of an example system 430 for alerts for virtual meetings consistent with the disclosure. In the example of FIG. 4, system 430 includes a processor 402 and a non-transitory machine-readable storage medium 432. The processor 402 can be a processing resource. The following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

The processor 402 may be a central processing unit (CPU), microprocessor, and/or other hardware device suitable for retrieval and execution of instructions stored in a non-transitory machine-readable storage medium 432. In the particular example shown in FIG. 4, the processor 402 may receive, determine, and send instructions 434, 436, and 438. As an alternative or in addition to retrieving and executing instructions, the processor 402 may include an electronic circuit comprising a number of electronic components for performing the operations of the instructions in the non-transitory machine-readable storage medium 432. With respect to the executable instruction representations or boxes described and shown herein, it should be understood that part or all of the executable instructions and/or electronic circuits included within one box may be included in a different box shown in the figures or in a different box not shown.

The non-transitory machine-readable storage medium 432 may be any electronic, magnetic, optical, or other physical storage device that stores executable instructions. Thus, the non-transitory machine-readable storage medium 432 may be, for example, Random Access Memory (RAM), an Electrically-Erasable Programmable Read-Only Memory (EEPROM), a storage drive, an optical disc, and the like. The executable instructions may be "installed" on the system 430 illustrated in FIG. 4. The non-transitory machine-readable storage medium 432 may be a portable, external or remote storage medium, for example, that allows the system 430 to download the instructions from the portable/external/remote storage medium. In this situation, the executable instructions may be part of an "installation package".

Determine instructions 434, when executed by the processor 402, may cause system 430 to determine, in response to a virtual meeting having been initiated, a state of a graphical user interface of the virtual meeting. For example, the state of the graphical user interface may be determined to be minimized.

Determine instructions 436, when executed by the processor 402, may cause system 430 to determine whether communication between participants of the virtual meeting has occurred in the virtual meeting. Such determination of communication between participants of the virtual meeting can be accomplished via a driver. The driver may detect communication including a text chat, audible speech, or combinations thereof.

Cause instructions 438, when executed by the processor 402, may cause system 430 to cause an alert to be displayed. The alert can be displayed on a display panel in response to communication having occurred and the state of the graphical user interface of the virtual meeting being minimized.

In the foregoing detailed description of the disclosure, reference is made to the accompanying drawings that form a part hereof, and in which is shown by way of illustration how examples of the disclosure may be practiced. These examples are described in detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, "a plurality of" an element and/or feature can refer to more than one of such elements and/or features.

What is claimed is:

1. A computing device, comprising:
a processor, wherein the processor is to:
in response to a virtual meeting having been initiated, determine whether:
a graphical user interface of the virtual meeting is minimized in a desktop environment;
communication between participants of the virtual meeting has occurred in the virtual meeting;
an audio output associated with the virtual meeting is muted; and
in response to communication having occurred, the graphical user interface being minimized, and the audio output associated with the virtual meeting being muted:
cause an alert to be displayed on a display panel indicating the graphical user interface is minimized; and
cause the graphical user interface to be restored in the desktop environment from being minimized.

2. The computing device of claim 1, wherein the processor is to determine whether the communication has occurred by determining whether audio communication, video communication, textual communication, or combinations thereof have occurred.

3. The computing device of claim 1, wherein the processor is to determine the virtual meeting has been initiated in response to a connection being initiated between the computing device and a remote computing device.

4. The computing device of claim 1, wherein the processor is to:
cause the graphical user interface to be restored for a predefined amount of time; and
minimize the graphical user interface after the predefined amount of time has been exceeded.

5. The computing device of claim 1, wherein the processor is to transmit the alert to a mobile device associated with a user of the computing device.

6. A non-transitory machine-readable storage medium including instructions that when executed cause a processor of a computing device to:
determine, in response to a virtual meeting having been initiated:
whether a graphical user interface of the virtual meeting is minimized in a desktop environment;
whether communication between participants of the virtual meeting has occurred in the virtual meeting via a driver, wherein the communication includes a text chat, audible speech, or combinations thereof;
whether an audio output associated with the virtual meeting is muted; and
cause, in response to communication having occurred and based on the graphical user interface of the virtual meeting being minimized and the audio output associated with the virtual meeting being muted:
an alert to be displayed on a display panel indicating the graphical user interface is minimized; and cause the graphical user interface to be restored in the desktop environment from being minimized.

7. The non-transitory storage medium of claim 6, including instructions to cause the alert to be displayed by causing an icon displayed on the display panel and associated with the virtual meeting to flash on the display panel.

8. The non-transitory storage medium of claim 6, including instructions to cause the alert to be displayed by generating and displaying an operating system alert via an operating system of the computing device.

9. The non-transitory storage medium of claim 6, including instructions to cause the processor to receive, from a computing device associated with a host of the virtual meeting, an input to cause the alert to be displayed on the display panel.

10. A computing device, comprising:
an audio output device associated with a virtual meeting;
an input device associated with the virtual meeting; and
a processor in communication with the audio output device associated with the virtual meeting and the input device associated with the virtual meeting, wherein the processor is to:
in response to the virtual meeting having been initiated, determine whether:
a graphical user interface of the virtual meeting is minimized in a desktop environment;
the audio output device associated with the virtual meeting is muted;
the input device associated with the virtual meeting is enabled; and
communication between participants of the virtual meeting has occurred in the virtual meeting; and
in response to communication having occurred, the graphical user interface being minimized, the audio output device associated with the virtual meeting being muted, and the input device associated with the virtual meeting being enabled:
cause an alert to be displayed on a display panel indicating the graphical user interface is minimized; and
cause the graphical user interface to be restored in the desktop environment from being minimized.

11. The computing device of claim 10, wherein:
the input device is a camera; and
the processor is to determine whether the input device is enabled by determining whether the camera is enabled.

12. The computing device of claim 10, wherein:
the input device is a microphone; and
the processor is to determine whether the input device is enabled by determining whether the microphone is enabled.

13. The computing device of claim 10, wherein the processor is to cause, in response to communication having occurred, the graphical user interface being minimized, the audio output device being muted, and the input device being enabled, the audio output device to be unmuted.

14. The computing device of claim 10, wherein the processor is to determine whether the communication has occurred in the virtual meeting via a driver to detect a keyword, audible speech, or combinations thereof.

* * * * *